United States Patent [19]

Shu

[11] Patent Number: 5,675,716

[45] Date of Patent: Oct. 7, 1997

[54] METHOD AND APPARATUS FOR VIVID COLOR CORRECTION IN BINARY PRINTING DEVICES

[75] Inventor: Joseph S. Shu, San Jose, Calif.

[73] Assignee: Seiko Epson Corporation, Tokyo, Japan

[21] Appl. No.: 320,538

[22] Filed: Oct. 11, 1994

[51] Int. Cl.[6] ............................ G06K 15/00; G03F 3/08; H04N 1/40
[52] U.S. Cl. .................. 395/109; 358/518; 358/534; 358/455; 358/456
[58] Field of Search ......................... 395/109, 101; 358/518, 519, 520, 534, 501, 298, 454, 455, 456, 457, 465, 466; 382/167, 162, 252, 270

[56] References Cited

U.S. PATENT DOCUMENTS

| | | | |
|---|---|---|---|
| 4,855,765 | 8/1989 | Suzuki et al. | 347/115 |
| 4,959,712 | 9/1990 | Tsuzuki et al. | 358/517 |
| 4,989,079 | 1/1991 | Ito | 358/520 |
| 5,003,326 | 3/1991 | Suzuki et al. | 347/115 |
| 5,119,186 | 6/1992 | Deacon et al. | 358/433 |
| 5,130,935 | 7/1992 | Takiguchi | 364/526 |
| 5,202,935 | 4/1993 | Kanamori et al. | 382/162 |
| 5,210,602 | 5/1993 | Mintzer | 358/456 |
| 5,231,515 | 7/1993 | Endo | 358/447 |
| 5,233,413 | 8/1993 | Fuchsberger | 358/518 |
| 5,239,370 | 8/1993 | Yamaguchi | 358/518 |
| 5,241,373 | 8/1993 | Kanamori et al. | 358/518 |
| 5,293,430 | 3/1994 | Shiau et al. | 358/527 |
| 5,296,947 | 3/1994 | Bowers | 358/523 |
| 5,303,071 | 4/1994 | Kakimura | 358/519 |
| 5,307,182 | 4/1994 | Maltz | 358/518 |
| 5,315,381 | 5/1994 | Yamashita et al. | 358/500 |
| 5,317,426 | 5/1994 | Hoshino | 358/515 |
| 5,319,473 | 6/1994 | Harrington | 358/501 |
| 5,394,250 | 2/1995 | Shono | 358/455 |
| 5,402,245 | 3/1995 | Motta et al. | 358/298 |
| 5,515,456 | 5/1996 | Ballard | 358/457 |

Primary Examiner—Dwayne Bost
Assistant Examiner—Tracy M. Legree
Attorney, Agent, or Firm—Eric B. Janofsky; Charles J. Barbas

[57] ABSTRACT

A vivid color correction technique eliminates artifacts from a predetermined tonal area of a halftone image to thereby improve the color vividness of that image. According to this technique, pixel tonal values associated with input colors are initially examined to determine a maximum color value. After error diffusion halftoning, the resulting binary pixel values are collectively processed to generate inter-color information for comparison with a selected harmonic color cluster. If the inter-color information specifies a color that does not match one of the colors of the selected harmonic cluster, the inter-color information is "corrected" to reflect an acceptable output color.

21 Claims, 7 Drawing Sheets

1

METHOD AND APPARATUS FOR VIVID COLOR CORRECTION IN BINARY PRINTING DEVICES

CROSS REFERENCE TO RELATED APPLICATIONS

The following applications, filed on an even date herewith and assigned to the assignee of the instant application contain related subject matter to the instant application:

IMPROVED ADAPTIVE FILTERING AND THRESHOLDING ARRANGEMENT FOR REDUCING GRAININESS OF IMAGES, Ser. No. 08/320,550, filed on Oct. 11, 1994 by Joseph S. Shu;

IMPROVED METHOD AND APPARATUS FOR REDUCING ARTIFACTS IN HALFTONED IMAGES USING GRAY BALANCE CORRECTION, Ser. No. 08/320,539 filed on Oct. 11, 1994 by Joseph S. Shu;

APPARATUS AND METHOD FOR ENHANCING COLOR SATURATION OF HALFTONED IMAGES, Ser. No. 08/320,451, on Oct. 11, 1994 by Joseph S. Shu;

IMPROVED METHOD AND APPARATUS FOR TONAL CORRECTION IN BINARY PRINTING DEVICES BY PREDISTORTION OF IMAGE DATA UTILIZING INK REDUCTION PROCESSING, Ser. No. 08/320,542, filed on Oct. 11, 1994 by Joseph S. Shu;

IMPROVED METHOD AND APPARATUS FOR DITHER ARRAY GENERATION TO REDUCE ARTIFACTS IN HALFTONED IMAGE DATA UTILIZING INK REDUCTION PROCESSING, Ser. No. 08/320,534, filed on Oct. 11, 1994 by Joseph S. Shu; and METHOD AND APPARATUS FOR MINIMIZING ARTIFACTS IN IMAGES PRODUCED BY ERROR DIFFUSION HALFTONING DATA UTILIZING INK REDUCTION PROCESSING, Ser. No. 08/269,708, filed on Jul. 1, 1994 by Joseph S. Shu.

BACKGROUND OF THE INVENTION

1. Field of the Invention

The present invention relates to digital color printing devices, and in particular, to a technique for minimizing artifacts ("erroneous colored dots") in the printed output of such devices, which artifacts are caused by error diffusion halftoning.

2. Description of the Related Art

Most computer-driven printing devices which generate hard copy, such as laser, dot-matrix and ink-jet printers, print in a binary fashion—the output medium is divided into an array of picture elements or "pixels" and the devices can either print a small colored dot at each pixel location or leave the pixel location blank. In the case of color printers, a dot color is chosen from a small set of colors. For example, a typical color printer may be configured to print three colors: cyan (C), magenta (M) and yellow (Y). By manipulating various combinations of CMY, additional colors such as blue (B), green (G), red (R) and black (K) may be generated. Each of these dots has a generally uniform color so that the resulting output consists of a total of eight arrayed colored and blank pixels, the latter pixel representing the color white (W).

Pictorial images such as those produced by photographic techniques or by computerized imaging systems, by contrast, are continuous in tonality. If such an image is divided into pixels, each pixel exhibits a "grayscale" color whose tonal value falls within a range of tonal values. In order to reproduce such "continuous-tone" images by means of electronic printing, the images must therefore be converted into a form which is suited to the characteristics of the printing device, generally a binary format. This conversion process, which may take many forms, is generically referred to as "halftoning." Although a halftone image actually consists solely of a spatial pattern of binary pixels (colored or blank dots), the human visual system integrates this pattern to create an illusion of a continuous-tone image.

During the printing process, the image to be printed is divided into a series of pixels and the value of the image in each pixel is quantized to produce a multi-bit digital word which represents the tonal value of the pixel. The image is thus converted to a stream of digital words which is provided to the printing device. In order to convert the format of each word into a format suitable for reproduction on the digital device, halftoning is performed on the digital word stream during a process called "preprocessing". Numerous halftoning techniques have been developed and refined over the years. In their simplest form, such techniques compare the value of each digital word with a threshold level, and generate a binary output pixel value depending on the relative values.

For example, a digital scanner processing a continuous-tone image generates a stream of multi-bit words representing the detected light intensities, i.e., pixel tonal values, typically for the colors RGB. The numerical value of these words generally ranges from 0 to 255 corresponding to a 256-level gray scale or an 8-bit word. If such a digital word stream is to be reproduced on a binary printing device, the halftoning process typically compares the scanner output words with a single threshold value to produce the required binary output pixel stream. (Illustratively, the fixed threshold value may be 128 for a grayscale value range between 0 and 255). In such a system, each 8-bit scanner word has effectively been compressed into a single-bit output word.

Naturally, such compression produces a significant loss of visual information and, in turn, creates visual distortions in the reproduced image that are not present in the original image. For example, overlaying the colors R=G=B=0 (in theory) generates the color K; however, in practice when printed together after halftoning, the RGB color dots typically produce a "muddled" shade of gray that saturates the print medium (due to excessive ink build-up). Since K is an important color, a technique known as "undercolor removal" has been developed to improve the production of K using a separate black ink.

According to this conventional technique, the lowest of the three RGB input color values is selected and replaced with K; thereafter, that lowest selected value is subtracted from the remaining two input color values. For example, if the values of the RGB output words from the digital scanner are:

| R | G | B |
| --- | --- | --- |
| 100 | 50 | 30 | application of the undercolor removal technique produces the following sequence:

| R | G | B | K |
|---|---|---|---|
| 70 | 20 | 0 | 30 |

This effectively eliminates one color, e.g., B, from the RGB input colors and, as is apparent in the case of R=G=B, substitutes that combination with K. Halftoning is then performed on the resulting color values. In order to reduce visual distortions created by the halftoning process, a technique known as "error diffusion" is employed to "diffuse" the "quantization error" (i.e., the difference between the input value represented by a multi-bit word and the output value represented by a single bit or two multi-bit words) proportionally among neighboring pixels.

This diffusion is performed individually on each of the resulting colors by adding a portion of the quantization error to the input values of the next pixel in the processing line and to neighboring pixels in the following line. The quantization error is added to the pixel values before processing so that the quantization error is "spread" over several pixels.

However, when employing undercover removal before such processing, "diffused" errors that accumulate from previous pixels may revive the negated B color and generate a "renewed" combination of RGB. When printed on the output medium, the resulting halftone image may be too black (and the medium may be saturated) since black ink is now overlayed on the RGB colored dot.

In addition, the accumulation of previous diffusion errors generates unwanted colors among pixels of a desired tonal area. Continuing with the example above, R represents the maximum color among the three input color values of RGB. However, after factoring in diffused errors from previously processed pixels, the values of the RGB color pixels may be:

| R | G | B |
|---|---|---|
| 120 | 140 | 10 |

Comparing each of these words with the fixed threshold value of 128 results in the following halftone pattern:

| R | G | B |
|---|---|---|
| 0 | 1 | 0 |

Thus, a green dot is produced in what should be a predominantly red area. This green dot, or "artifact", reduces the vividness of the red color in the resulting image and thus reduces the quality of that image.

Therefore, it is among the objects of the present invention to provide a method and apparatus for eliminating such artifacts from an image.

Another object of the present invention is to provide apparatus and a method of improving the quality of the halftone images produced by a binary printing device.

Still another object of the invention is to provide a method and apparatus which minimizes image artifacts due to error diffusion halftoning in the output images produced by a binary printing device, such as a color ink jet printer or laser printer.

Still yet another object of the invention is to provide such a method which can be implemented relatively easily either in specialized hardware or in existing printer drivers. Other objects will, in part, be obvious and will, in part, appear hereinafter.

DESCRIPTION OF THE INVENTION

SUMMARY OF THE INVENTION

Briefly, the invention resides in a color correction technique for eliminating artifacts from predetermined tonal areas of a halftone image to thereby improve the color vividness of that image. These artifacts are generally caused by the accumulation of diffusion errors which, after halftoning operations, produces colors that adversely affect the hue of the image. The vivid color correction technique described herein identifies these adverse colors and adjusts their values to reflect acceptable colors for those image areas.

Specifically, pixel tonal values associated with three input colors are initially examined to determine a maximum color value. After processing in accordance with conventional error diffusion halftoning operations, the resulting binary pixel values are collectively processed to generate inter-color information for comparison with a selected harmonic color cluster. The selected cluster is preferably chosen from a plurality of predefined harmonic color clusters in response to the maximum input color value.

If the inter-color information specifies a color that matches one of the colors of the selected harmonic cluster, thereby indicating an acceptable color, no further processing is required and the binary pixel values are passed to an output buffer for printing. On the other hand, if the specified color does not match one of cluster colors, then the inter-color information is "corrected" to reflect acceptable output color values.

In the illustrative embodiment, the inter-color information comprises three bits of data (one for each input color) and the correction process involves transposing the value of one of these bits such that it is equal to the values of the remaining two bits. Such correction results in additional error that is subsequently diffused among neighboring pixels to compensate for the corrected output color values. Thus, although individual pixel values in a predetermined tonal area may be modified, the average values of the pixels in that area do not change.

Advantageously, the inventive method can be incorporated easily into the driver software of a printing device at relatively little cost or embodied in specialized hardware in the printer port or the printer itself. When the inventive method is utilized high-quality halftone images can be produced by means of error diffusion halftoning with minimized artifacts.

BRIEF DESCRIPTION OF THE DRAWING

For a better understanding of the nature and objects of the invention, reference should be had to the following detailed description, taken in connection with the accompanying drawing, in which.

DETAILED DESCRIPTION OF AN ILLUSTRATIVE EMBODIMENT

Figure 1:
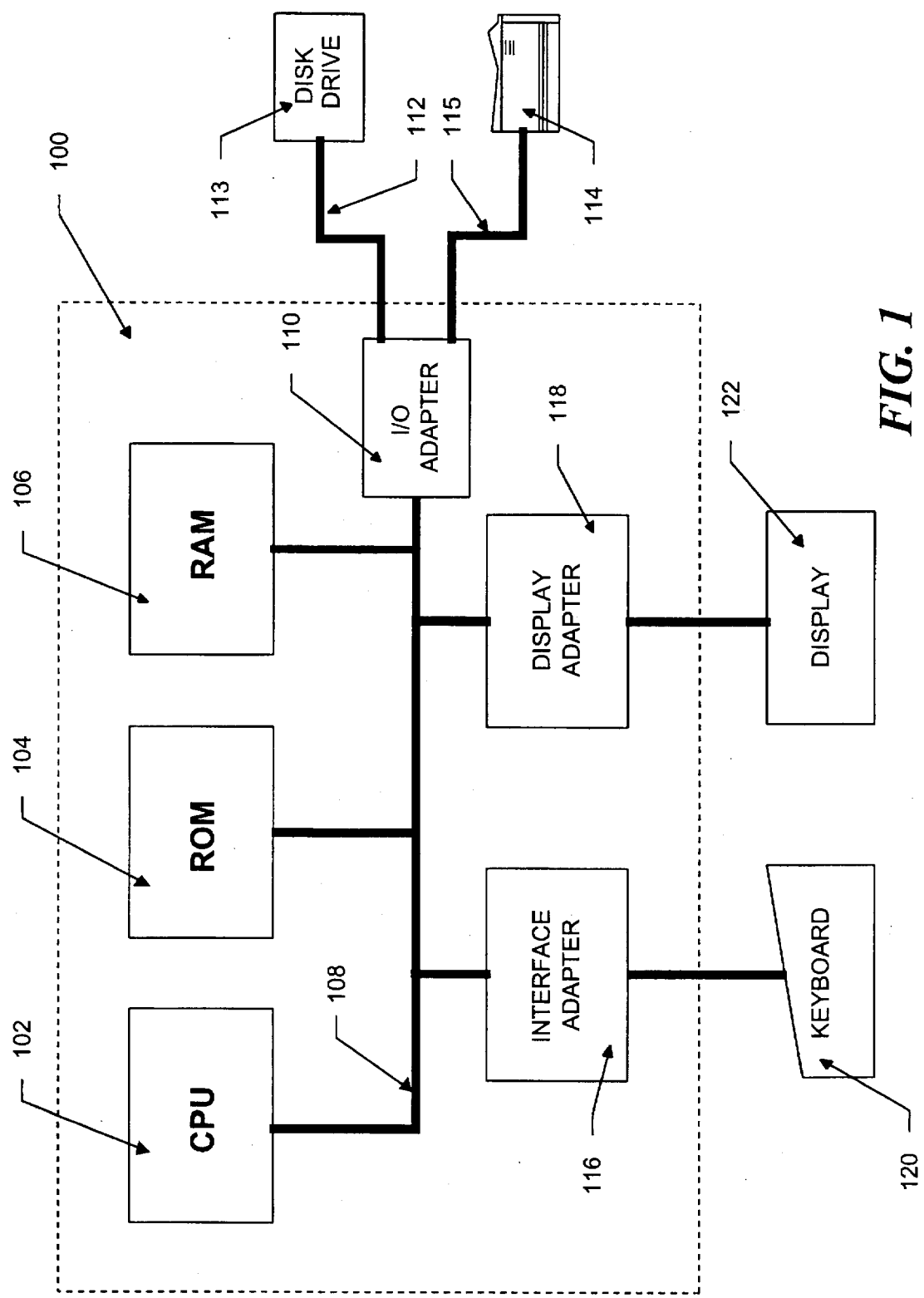
FIG. 1 is a block schematic diagram of a computer system, for example, a personal computer system on which vivid color correction operations using the inventive arrangement described herein can operate.

The invention is preferably practiced in the context of an operating system resident on a personal computer such as the IBM PS/2 or Apple Macintosh computer. A representative hardware environment is depicted in FIG. 1, which illustrates a typical hardware configuration of a computer 100 in accordance with the subject invention. The computer 100 is controlled by a central processing unit (CPU) 102, which may be a conventional microprocessor; a number of other units, all interconnected via a system bus 108, are provided to accomplish specific tasks. Although a particular computer may only have some of the units illustrated in FIG. 1 or may have additional components not shown, most computers will include at least the units shown.

Specifically, computer 100 shown in FIG. 1 includes a random access memory (RAM) 106 for temporary storage of information, a read only memory (ROM) 104 for permanent storage of the computer's configuration and basic operating commands and an input/output (I/O) adapter 110 for connecting peripheral devices such as a disk unit 113 and printer 114 to the bus 108, via cables 112 and 115, respectively. A user interface adapter 116 is also provided for connecting input devices, such as a keyboard 120 and other known interface devices including mice, speakers and microphones, to the bus 108. Visual output is provided by a display adapter 118 which connects the bus 108 to a display device 122 such as a video monitor. The computer 100 has resident thereon, and is controlled and coordinated by, an operating system.

A computer system such as that shown in FIG. 1 generally includes a printing device which is electrically connected to the computer system and controlled by it in order to generate a permanent image on a selected medium. In order to print a document which is displayed on the monitor or stored within the memory, several actions must take place. First, since the print medium generally has a fixed size, the printable information must be divided into pieces which are small enough to fit on the selected medium, a process which is called pagination. In addition, the information may need to be reformatted from the format in which it is either displayed or stored into a format which is suitable for controlling the printing device to actually perform the printing on the medium. The reformatting in this latter step may include a preprocessing step in which a graphical display is converted into the form used by the printing device by the halftoning operations discussed above.

The pagination and reformatting necessary to convert the printable information into a form which can be printed by a given printing device can be performed by specialized hardware, but are generally performed by software programs running within the computer system. The pagination is performed by either an application program which generated the initial output or by an operating system which is a collection of utility programs that perform basic file manipulation functions. The reformatting, including the undercolor removal and halftoning operations described above, are specific to the printing device and are usually contained in a software program called a "driver" which may be part of the operating system, but must be specifically associated with a particular printing device. The driver program receives textual and image information from the computer system and performs such processing operations to generate signals that can directly control the printing device.

Figure 2:
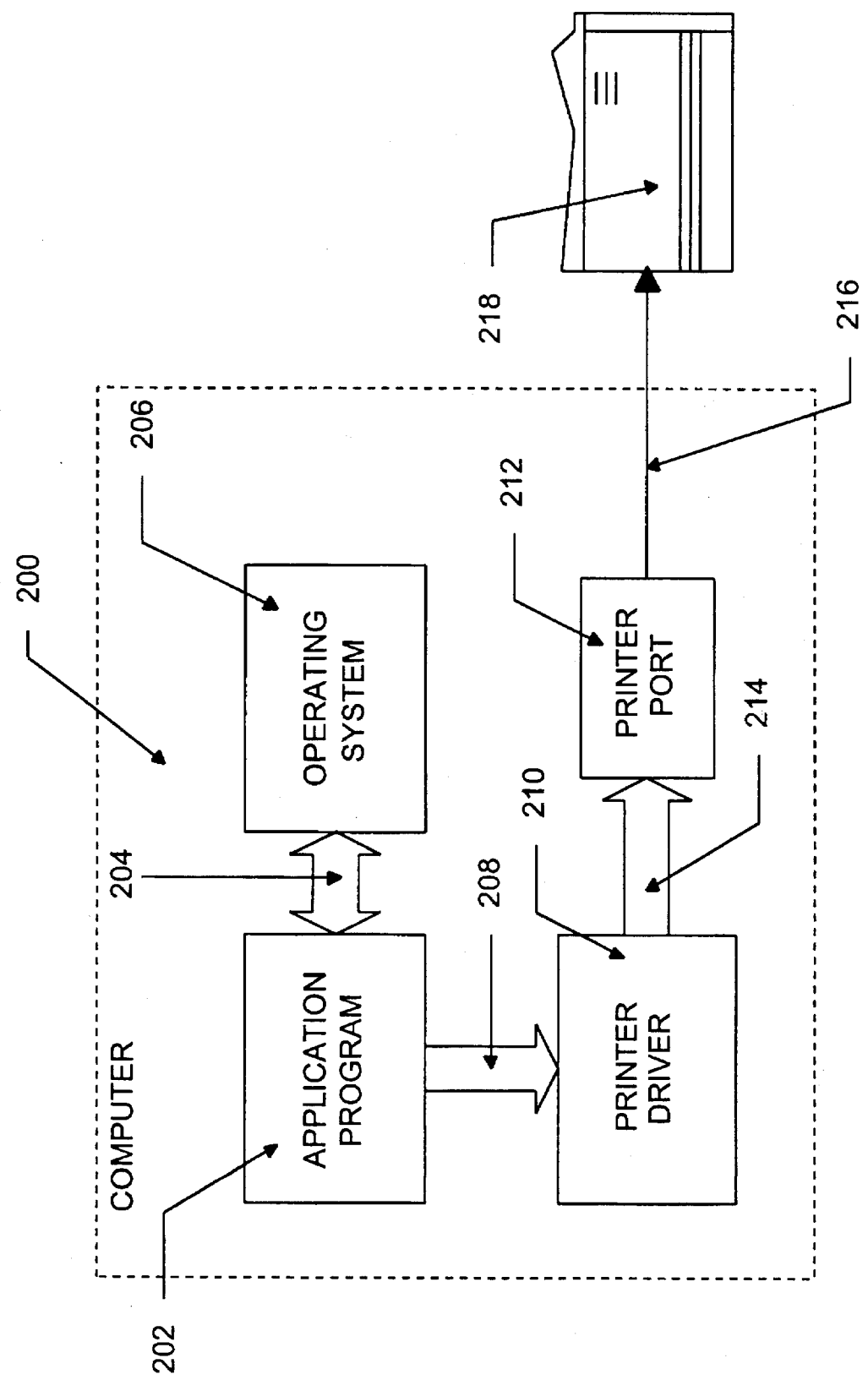
FIG. 2 is a schematic block diagram of a prior art computer system showing the relationship of an application program, an operating system and a printer driver in which the vivid color correction preprocessing operations are performed.

For example, FIG. 2 is a schematic illustration of a typical computer system utilizing an application program, an operating system and a printer driver. The computer system is schematically represented by dotted box 200, the application program is represented by box 202 and the operating system by box 206. The interaction between the application program 202 and the operating system 206 is illustrated schematically by arrow 204. This dual program system is used on many types of computer systems ranging from mainframes to personal computers.

The method for handling printing, however, varies from computer to computer, and, in this regard, FIG. 2 represents a typical prior art personal computer system. In order to provide printing functions, the application program 202 interacts (as shown schematically by arrow 208) with printer driver software 210. The printer driver software 210 performs undercolor removal and halftoning operations to convert the multi-bit words representing numerical tonal values of typical input color pixels (e.g., RGB) into a binary output pixel stream representing selected of the colors RGBK. Furthermore, the driver software 210 may perform other operations to produce a reformatted information stream containing embedded commands and converted graphical information as shown schematically as arrow 214.

The converted information stream is, in turn, applied to a printer port 212 which contains circuitry that converts the incoming information stream into electrical signals. The signals are then sent over a cable 216 to the printer 218. Printer 218 usually contains an "imaging engine" which is a hardware device or a ROM-programmed computer which takes the incoming information stream and converts it into the electrical signals necessary to drive the actual printing elements. The result is a "hard copy" output on the selected medium. The apparatus which performs the error diffusion process may also be incorporated into specialized hardware located in the printer port 212 of the printer 218 itself.

Figure 3:
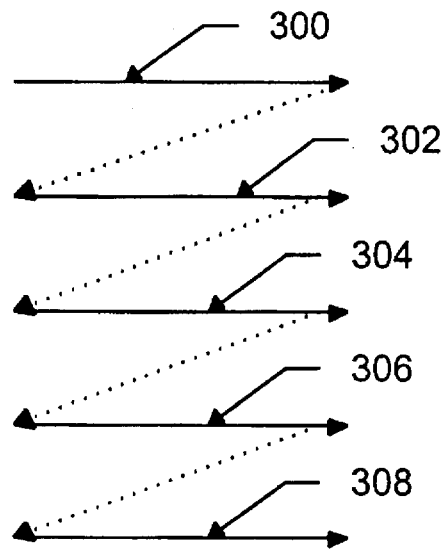
FIG. 3 illustrates a sequence for processing pixels in a conventional line processing pattern using error diffusion halftoning.

The error diffusion process itself is well-known and is, for example, described in detail in "Digital Halftoning"" by Robert Ulichney, printed by the MIT Press, Cambridge, Mass. and London, England, 1990, at pps. 239–319. During the error diffusion process, the pixels which comprise the original image are processed on a line-by-line fashion and, in each line, the pixels are processed in single direction (from left-to-right or right-to-left). A common line processing pattern is shown in FIG. 3 where each of the pixel lines 300, 302, 304, 306 and 308 is processed from left-to-right, then the next line is processed from left-to-right, and the following line is processed from left to right, etc. until the entire image is processed in the top to bottom direction.

Figure 4:
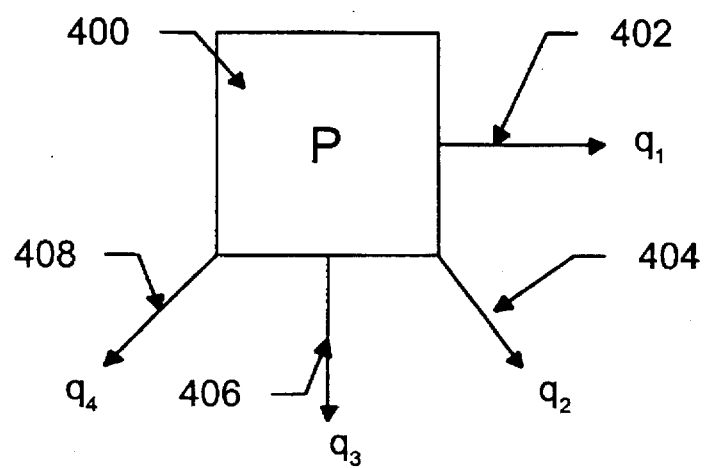
FIG. 4 illustrates an illustrative selection of proportional coefficients used in the error diffusion processing when pixels are processed in accordance with the pattern of FIG. 3.

FIG. 4 illustrates diffusion of the error generated during the processing of each pixel to neighboring pixels in the case where processing proceeds along the line in the left-to-right direction. In particular, each pixel is processed by comparing its value to a predetermined threshold value where the pixel "value" is the original gray scale value plus error adjustments resulting from the previous processing of other pixels. In the illustrative embodiment described herein, the fixed threshold value may be 128 for a gray scale value range between 0 and 255. If the value of the pixel exceeds the threshold value, then a "1" or dot is output. Alternatively, if the value of the pixel is less than the threshold value, then a "0" or no dot is output. An error value is then determined by subtracting the value of the dot which is actually output from the input value. This error is then "diffused" or spread among neighboring, but unprocessed, pixels.

This "diffusion" process is illustrated in FIG. 4 where the pixel being processed is depicted as box 400. In the illustrated arrangement, the error resulting from the processing is spread to the neighboring pixel to the immediate right of the processed pixel 400 (as indicated by arrow 402) and to three neighboring pixels on the next line of binary pattern pixels as indicated by arrows 404, 406 and 408. Before being added to the neighboring pixels, the error value is multiplied by a proportionality constant. The values of these constants, $q_1$ $q_2$ $q_3$ and $q_4$ are arranged such that $q_1+q_2+q_3+q_4=1$. Illustratively, the following weights may be used: $q_1=5/16$, $q_2=1/16$, $q_3=7/16$ and $q_4=3/16$. After pixel 400 has been processed, the neighboring pixel to the right of pixel 400 is processed by adding the proportionalized error value to the pixel value and processing it in the same manner as pixel 400. After each pixel in a line has been processed in this manner, the next line in the image is processed in the same manner.

As noted, execution of undercover removal operations on input color pixels prior to error diffusion halftoning processing establishes generally tainted shades of K, while reversing the order of these operations produces unwanted colors in a desired tonal area. In general, the artifacts caused by the accumulation of diffusion errors adversely affect the hue and color vividness of the resulting image and thus degrade the quality of that image.

For example, assume RGB input color pixels have the following tonal values:

TABLE 1

| R | G | B |
|---|---|---|
| 100 | 50 | 30 |

Here, R has a maximum value among the three input colors and, as may be expected, it is desired that R maintain that relationship with those input colors throughout the pre-processing operations performed prior to outputting the processed color values to the printing device. Since, as a result of halftoning, each input color may assume a binary value of either "0" or "1", the possible binary combinations (and their resulting colors) associated with the input colors are:

TABLE 2

| R | G | B | |
|---|---|---|---|
| 0 | 0 | 0 | (K) |
| 0 | 0 | 1 | (B) |
| 0 | 1 | 0 | (G) |
| 0 | 1 | 1 | (C) |

TABLE 2-continued

| R | G | B | |
|---|---|---|---|
| 1 | 0 | 0 | (R) |
| 1 | 0 | 1 | (M) |
| 1 | 1 | 0 | (Y) |
| 1 | 1 | 1 | (W) |

Clearly, R is not a maximum value (i.e., R does not assume a value of "1") for the colors BGC and, significantly, these latter colors function to adversely affect the hue of R. However, R does assume a maximum value for the colors MY, indicating that they do not alter the hue of R, and these colors are therefore referred to as "compatible" colors. Accordingly, for a red "dominant" pixel area, BGC are "adverse" colors that should be avoided when printing an image.

However, as a result of error accumulation during error diffusion, these adverse colors do appear as artifacts in such designated "off-limit" areas. For example, in the illustrative embodiment using the error filter circuit of FIG. 4, the accumulated error values from previously processed pixels may transform the input tonal values of Table 1 into the following tonal values:

TABLE 3

| R | G | B |
|---|---|---|
| 80 | 130 | 135 |

After halftoning in accordance with a predetermined threshold value, e.g., 128, the resulting halftone pattern is:

TABLE 4

| R | G | B |
|---|---|---|
| 0 | 1 | 1 |

Thus, a cyan dot is produced in this predominantly red area and, as noted above, this artifact reduces the color vividness and quality of the resulting printed image.

Figure 5:
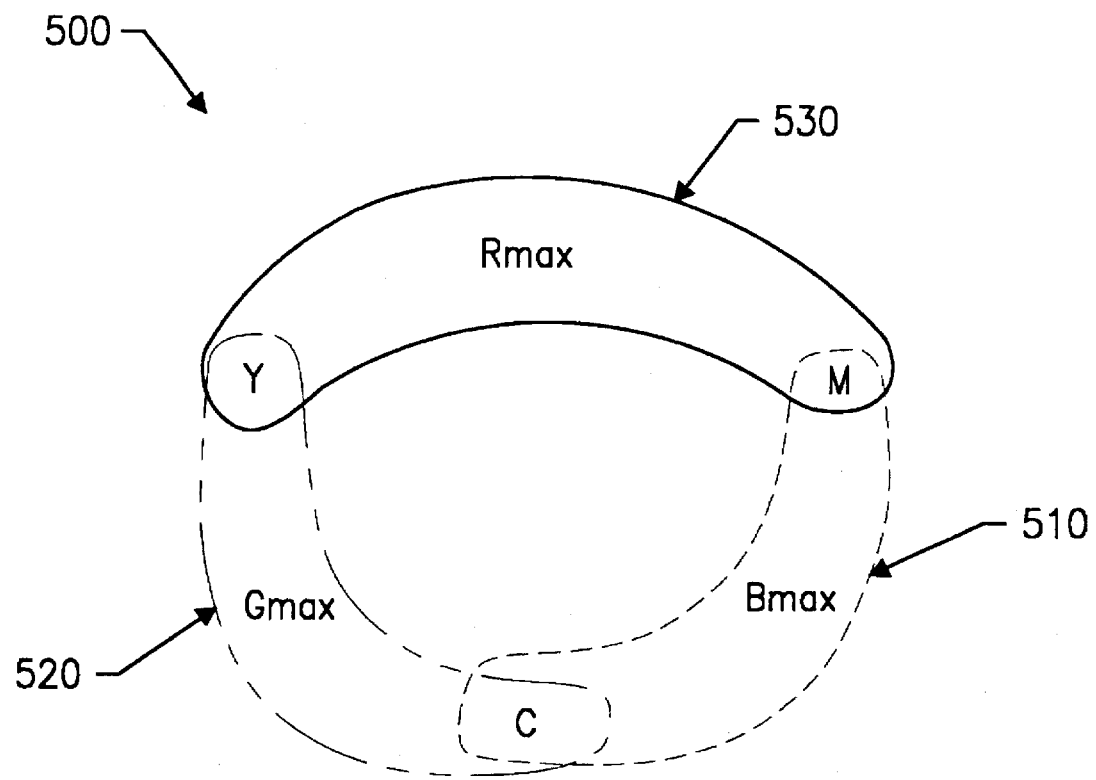
FIG. 5 is a schematized diagram of a "rule" graph illustrating predefined harmonic color clusters in accordance with the novel vivid color correction technique.

FIG. 5 is a schematized "rule" graph 500 illustrating groups of dominant input colors (Rmax, Gmax and Bmax) and their associated compatible colors. In accordance with the invention, these groups represent predefined harmonic color clusters for use with the vivid color correction technique. For example, where B is the maximum input color value, CM are compatible colors as indicated by the dotted circle enclosing the harmonic color cluster 510. Similarly, the colors CY conform to a maximum input pixel value for the color G as indicated by the dotted-segmented circle enclosing the cluster 520.

Graph 500 also depicts colors that adversely affect the hue of these maximum input colors. Specifically, the adverse colors are those colors not encircled for a particular maximum input color value. Thus, for a Bmax input pixel area, the colors RYG are adverse colors and for a Gmax input pixel area, the colors BRM should be avoided.

It should be noted that the colors K and W are not shown on the graph of FIG. 5 primarily because they do not impact the hue of the input colors, although they do affect the brightness of those colors. Nevertheless, the colors K and W are utilized in accordance with the color correction technique when correcting the adverse colors. Specifically, the vivid color correction technique identifies these adverse colors and thereafter "corrects" their tonal values to reflect acceptable colors for a particular tonal area.

Figure 6A:
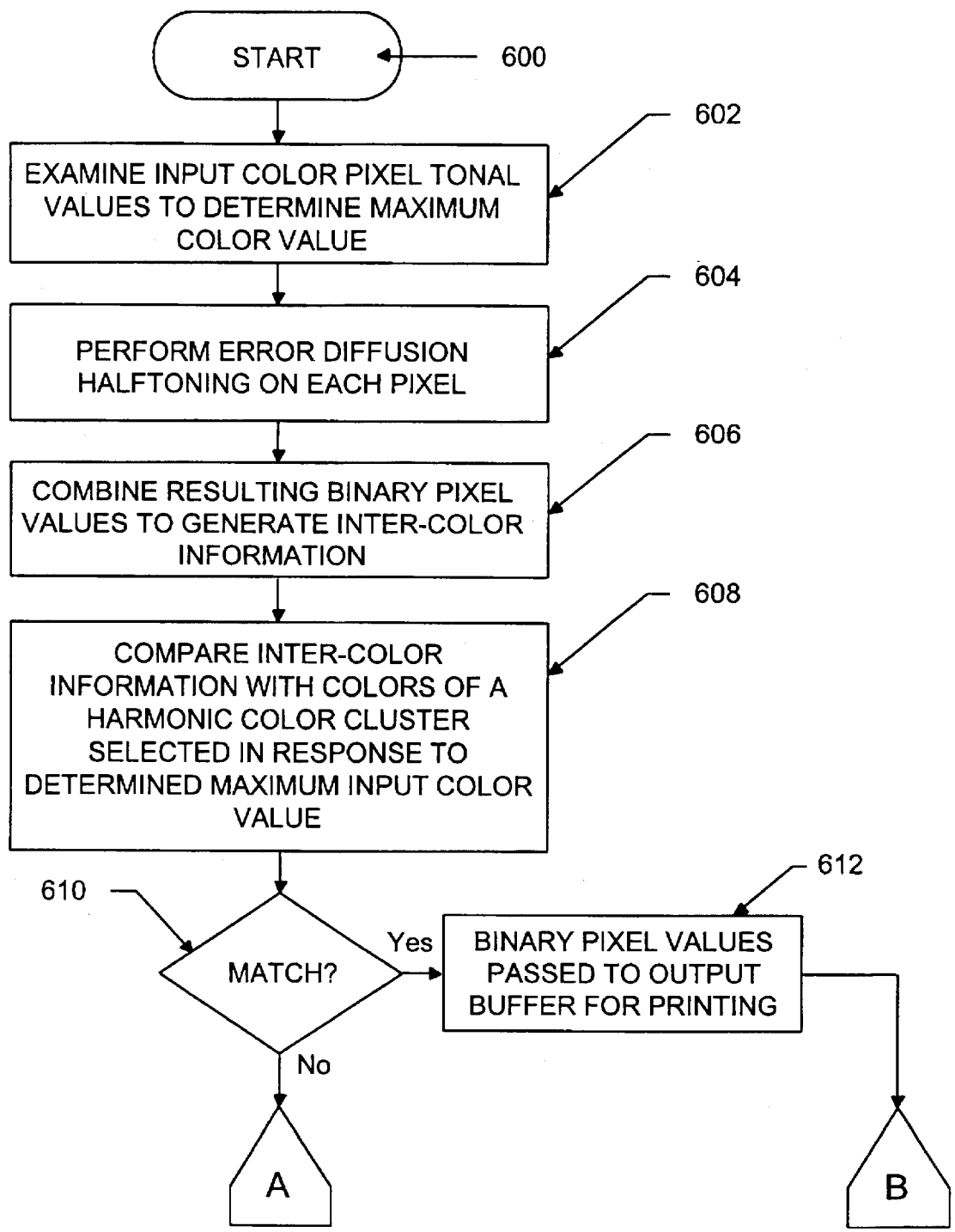
FIGS. 6A and 6B are illustrative flowcharts of a vivid color correction routine in accordance with the invention.
Figure 6B:
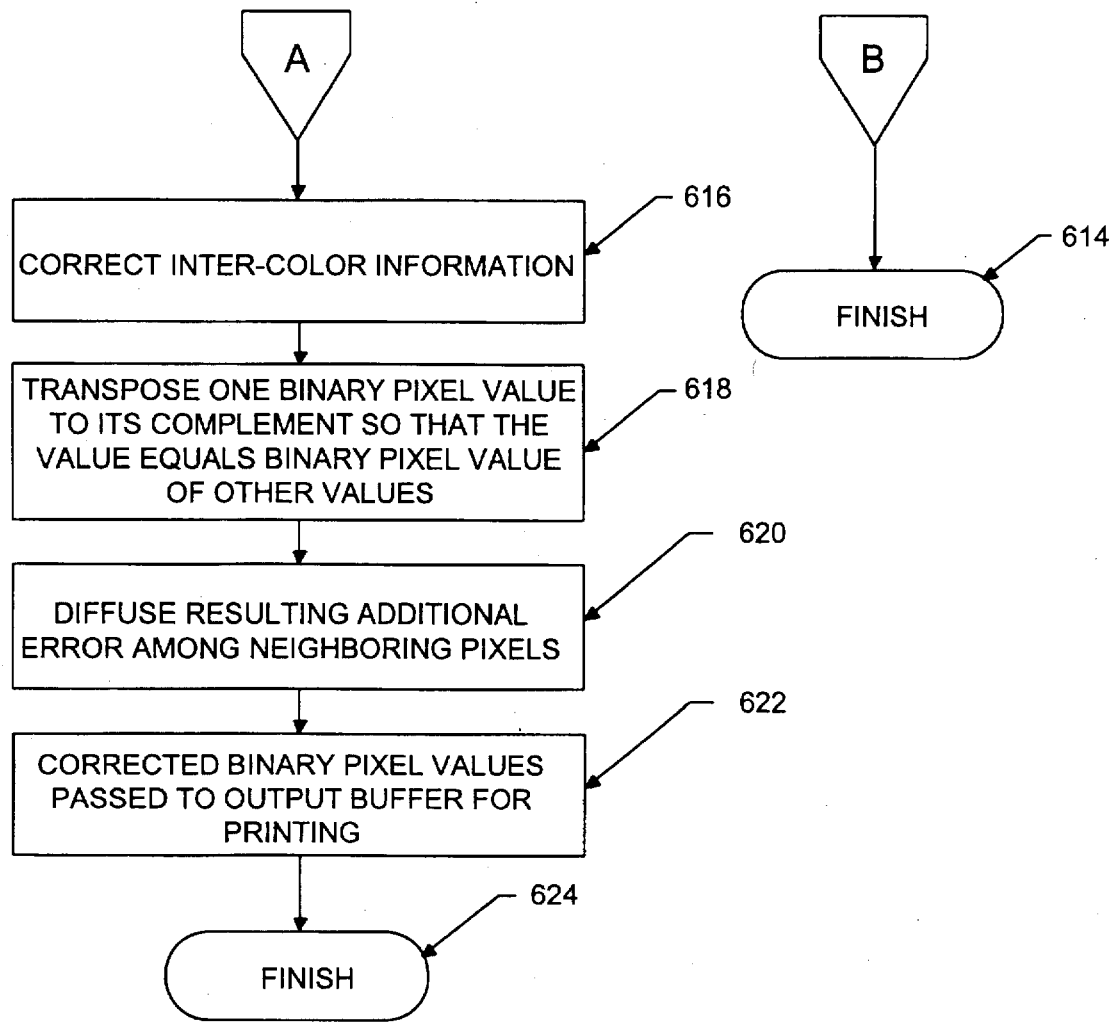

FIGS. 6A and 6B are illustrative flowcharts of the novel color correction routine executed in accordance with the printer driver software. The routine starts at Step 600 and proceeds to Step 602 where pixel tonal values associated with three (RGB) input colors are examined to determine the maximum color value. Conventional error diffusion halftoning operations are then performed on each pixel in Step 604 and, in Step 606, the resulting binary pixel values are combined to generate inter-color information. In Step 608, the inter-color information is compared with a harmonic color cluster that is selected from the predefined harmonic color clusters of FIG. 5 in response to the determined maximum input color value.

In Step 610 it is determined whether the inter-color information specifies a color that matches one of the colors of the selected harmonic cluster. If so, thereby indicating an acceptable color, the routine proceeds to Step 612 where no further processing is required and the binary pixel values comprising the inter-color information are passed to an output buffer for printing. The routine then finishes at Step 614. On the other hand, if the specified color does not match one of cluster colors, then the routine passes to Step 616 where the inter-color information is corrected to reflect an acceptable output color value.

In the illustrative embodiment, the inter-color information comprises three bits of data (one for each input color). In Step 618, the value of one of these bits is transposed to its complement such that its value is equal to the values of the remaining two bits. As an example and referring to Tables 1, 2 and FIG. 5, the colors BGC are adverse colors for a pixel area where R is the maximum input value. These colors are represented by the following inter-color information:

TABLE 5

| R | G | B | |
|---|---|---|---|
| 0 | 0 | 1 | (B) |
| 0 | 1 | 0 | (G) |
| 0 | 1 | 1 | (C) |

According to the correction process of the present invention, the value of the "non-majority" bit is converted to the values of the remaining two bits to generate the following corrected output values:

TABLE 6

| R | G | B | |
|---|---|---|---|
| 0 | 0 | 0 | (K) |
| 0 | 0 | 0 | (K) |
| 1 | 1 | 1 | (W) |

Thus, the vivid color correction technique converts the adverse colors to one of the colors K or W. As noted, these latter colors do not alter the hue of the dominant R color and, thus, they are considered acceptable colors despite changing the brightness of that color. However, the conversion to the color K or W results in additional error that must be diffused among neighboring pixels to compensate for the corrected output color values, as indicated in Step 620. This error can be expressed as the difference between the input tonal value and the output tonal value after halftoning (as a grayscale value):

$Rerr = Rin - Rout$ $Gerr = Gin - Gout$ $Berr = Bin - Bout$

Referring to input tonal values of Table 3 and the resulting halftone pattern of Table 4, the error and output tonal values are:

$Rin = 80$ ("0") $Rout = 0$ and $Rerr = 80$ $Gin = 130$ ("1") $Gout = 255$ and $Gerr = -125$ $Bin = 135$ ("1") $Bout = 255$ and $Berr = -120$ According to the correction method, Rout is then converted to "1", thereby adjusting its gray scale tonal value to 255. The resulting additional error Rerr is equal to 80− (255) or −175; this is the additional error that must be diffused among neighboring pixels. It can be appreciated that although individual pixel values in the predetermined tonal area may be modified, the average value of the pixels in that area do not change. The routine then proceeds to Step 622 where the corrected binary output pixel values are passed to the output buffer for printing and the routine finishes at Step 624.

Figure 7:
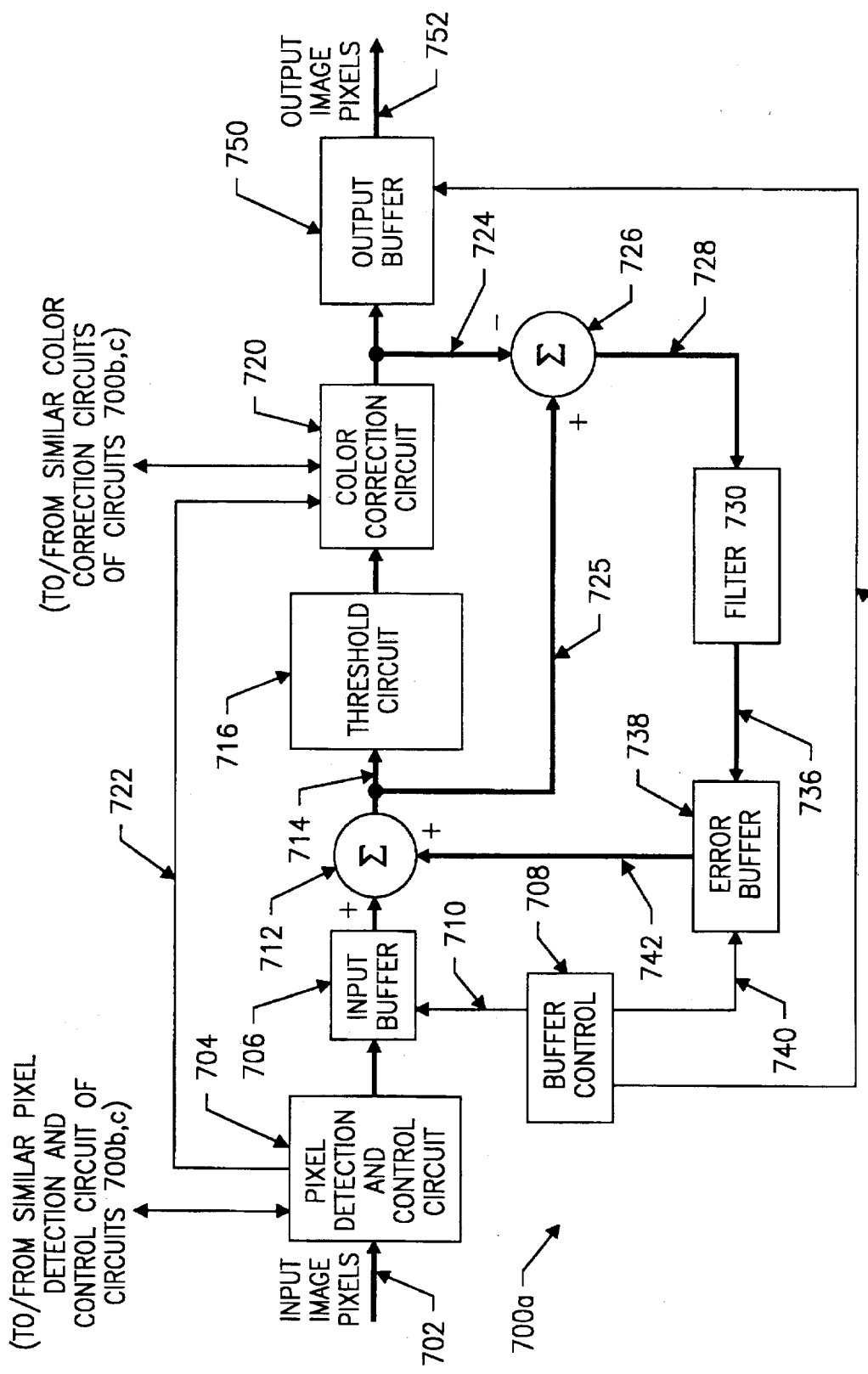
FIG. 7 is a block schematic diagram of a modified error diffusion halftoning apparatus used for implementing the vivid color correction technique in accordance with the invention.

FIG. 7 is an illustrative schematic block diagram depicting an error diffusion halftoning circuit modified in accordance with the principles of the invention. Preferably, there is one such circuit for each input color pixel and, thus for the illustrative embodiment, there are three error diffusion halftoning circuits 700a-c (one for each RGB color pixel input). For ease of description and ease of depiction, only one of these circuits 700a will be shown and described.

The error diffusion circuit receives a stream 702 of input grayscale image pixels represented by digital words from an imaging device (not shown) in a conventional manner. The stream of image pixels is received by a pixel detection and control circuit 704 that is configured to control various elements of the circuit 700a. Specifically, as described further below, the pixel detection and control circuit 704 interacts with similar circuits of the error diffusion halftoning circuits 700b,c to collectively determine the maximum value among the three input image pixels and, in response to this determination, generate appropriate control signals for enabling logical operations within color correction circuits (such as circuit 720), as described further herein.

The input image pixels pass serially through the detection and control circuit 704 and into a conventional input buffer 706. Buffer 706 is, in general, of sufficient size to store incoming image pixel words for an entire line of pixels although other buffer sizes are contemplated within the teachings of the invention. Buffer 706 is, in turn, controlled by buffer control circuit 708 (as indicated schematically by arrow 710) to output the stored values, in line order, to a summing circuit 712 that is configured to diffuse "error" values produced by the processing of previous pixels as described further below. In particular, under control of the buffer control circuit 708, buffer 706 can serially output the stored pixel data in a "left-to-right" order (last-in, first-out) in addition to outputting the stored pixel data in a "right-to-left" order (first-in, first-out), if desired.

The stored input data produced at the output of input buffer 706 is applied to a threshold circuit 716 by way of summing circuit 712 and line 714. The output of threshold circuit 716 is a quantized binary image (comprised of "0's" and "1's") which is produced by comparing the pixel values (each pixel "value" comprises the original input image value and "error" adjustments introduced by summing circuit 712) with a predetermined, fixed threshold value and outputting a "1" if the pixel value is greater than the threshold and outputting a "0" if the pixel value is less than or equal to the threshold value. Illustratively, the threshold circuit 716 may use a fixed threshold value such as 0.5 (for a grayscale value range between 0 and 1) or 128 (for a grayscale value range between 0 and 255).

The quantized binary signal generated by the threshold circuit 716 is fed to a color correction circuit 720 according to the invention. The circuit 720 preferably operates in conjunction with similar circuits of the error diffusion halftoning circuits 700b,c to collectively process the binary signal values generated by respective threshold circuits to generate inter-color information for comparison with a selected harmonic color cluster. As previously noted, the selected cluster is preferably chosen from the plurality of predefined harmonic color clusters shown in FIG. 5. Accordingly, the pixel detection and control circuit 704 generates a control signal over line 722 to circuit 720 for selecting an appropriate cluster in response to the maximum input color value.

It will be apparent to those skilled in the art that the circuits 704 and 720 contain circuitry (e.g., comparators, inverters, registers, etc.) needed to implement the logical operations set forth in the routine of FIG. 6 in order to generate correct binary pixel values. The exact circuit configurations of circuits 704 and 720, along with the exact arithmetic, logical and synchronizing operations performed by those circuits (and among similar circuits of error diffusion halftoning circuits 700b,c) can be varied without departing from the spirit and scope of the invention.

The binary output value generated by the color correction circuit 720 is applied, via output line 724, to a second summing circuit 726 which subtracts this quantized binary signal value from the unquantized input signal on line 725 to generate a quantization error value on line 728. This quantization error value is applied to filter circuit 730 which multiplies the error value by proportionality coefficients to generate diffused error values on line 736 for storage in error buffer 738. These diffused error values are subsequently added to predetermined neighboring pixels by summing circuit 712 during processing of the next line of pixels.

Error buffer 738 is also controlled by buffer control circuit 708 (as indicated schematically by arrow 740) to output selected stored values to summing circuit 712 via output line 742. Under control of the buffer control circuit 708, error buffer 738 can serially output the stored pixel data in a "left-to-right" order (last-in, first-out) or it may output the stored pixel data in a "right-to-left" order (first-in, first-out) so as to match the error data with the input data being shifted out of input buffer 706.

During processing of a line of pixels, buffer control circuit 708 controls both input buffer 706 and error buffer 738 to sequentially provide an input pixel value from buffer 706 to summing circuit 712 and a diffused error value from error buffer 738 to summing circuit 712. This summing circuit then provides sequentially error-diffused values to threshold circuit 716 which generates the quantized output for reception by the color correction circuit 720. The output of the color correction circuit 720 is also provided to an output buffer 750 which is also controlled by buffer control circuit 708 (as indicated schematically by arrow 754). Output buffer 750 can then output a serial stream of binary pixels for provision to the printing device on line 752.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description as shown in the accompanying drawing shall be interpreted as illustrative and not in the limiting sense. It is also to be understood that the following claims are intended to cover all of the generic and specific features of the invention described herein.

What is claimed is:

1. A method for improving the color vividness of a halftone image generated from a plurality of streams of continuous-tone input pixels, each stream comprising pixels having values of a specific tonal color, the method comprising the steps of:

converting a first input pixel of each stream into a first binary pixel value;

collectively processing said first binary pixel value from each stream to generate inter-color information;

providing said inter-color information to an output buffer for printing as processed halftone color pixel values that improve the color vividness of the halftone image; and determining a maximum tonal color value from among said first input pixels of each stream, wherein said collectively processing step comprises the step of comparing said inter-color information with color values of a selected harmonic color cluster.

2. The method of claim 1 wherein said collectively processing step further comprises the step of choosing said selected harmonic color cluster from among a plurality of harmonic color clusters in response to said determined maximum tonal color value.

3. The method of claim 1 wherein said comparing step comprises the step of, if said inter-color information matches a color value of said selected harmonic color cluster:

passing said inter-color information to said output buffer without further processing.

4. The method of claim 1 wherein said comparing step comprises the step of, if said inter-color information does not match a color value of said selected harmonic color cluster:

correcting said inter-color information to generate first predetermined color values.

5. The method of claim 4 wherein said inter-color information comprises three bits and wherein said correcting step comprises the step of transposing the value of one of the three bits to equal the values of the remaining two bits to thereby convert said inter-color information to correctly processed halftone color pixel values.

6. A method for improving the color vividness of a halftone image generated from a plurality of streams of continuous-tone input pixels, each stream comprising pixels having values of a specific tonal color, the method comprising the steps of:

converting a first input pixel of each stream into a first binary pixel value;

collectively processing said first binary pixel value from each stream to generate inter-color information; and providing said inter-color information to an output buffer for printing as processed halftone color pixel values that improve the color vividness of the halftone image, wherein said converting step comprises the steps of:
iteratively comparing the tonal value of each first input pixel with a threshold value;
selecting a binary pixel value based on the comparison;
electronically storing an error value defining the difference between the first input pixel value and the threshold value; and
diffusing the error value among neighboring pixels of each stream.

7. The method of claim 6 further comprising the step of determining a maximum tonal color value from among said first input pixels of each stream.

8. The method of claim 7 wherein said collectively processing step comprises the step of comparing said inter-color information with color values of a selected harmonic color cluster.

9. The method of claim 8 wherein said collectively processing step further comprises the step of choosing said selected harmonic color cluster from among a plurality of harmonic color clusters in response to said determined maximum tonal color value.

10. The method of claim 8 wherein said comparing step comprises the step of, if said inter-color information matches a color value of said selected harmonic color cluster:

passing said inter-color information to said output buffer without further processing.

11. The method of claim 8 wherein said comparing step comprises the step of, if said inter-color information does not match a color value of said selected harmonic color cluster:

correcting said inter-color information to generate first predetermined color values.

12. The method of claim 11 wherein said inter-color information comprises three bits and wherein said correcting step comprises the step of transposing the value of one of the three bits to equal the values of the remaining two bits to thereby convert said inter-color information to correctly processed halftone color pixel values.

13. The method of claim 12 wherein said correcting step further comprises the steps of:

generating additional error in response to said transposing step; and diffusing said additional error among neighboring pixels of each stream.

14. An apparatus for improving the color vividness of a halftone image generated from a plurality of streams of continuous-tone input pixels, each stream comprising pixels having values of a specific tonal color, the apparatus comprising:

means for converting a first input pixel of each stream into a first binary pixel value;

means for collectively processing said first binary pixel value from each stream to generate inter-color information;

means for providing said inter-color information to an output buffer for printing as processed halftone color pixel values that improve the color vividness of the halftone image; and means for determining a maximum tonal color value from among said first input pixels of each stream, wherein said collectively processing means comprises a color correction circuit for comparing said inter-color information with color values of a selected harmonic color cluster.

15. The apparatus of claim 14 wherein said color correction circuit comprises means for correcting said inter-color information to generate first predetermined color values when said inter-color information does not match a color value of said selected harmonic color cluster.

16. The apparatus of claim 15 wherein said inter-color information comprises three bits and wherein said correcting means transposes the value of one of the three bits to equal the values of the remaining two bits to thereby convert said inter-color information to correctly processed halftone color pixel values.

17. The apparatus of claim 14 wherein said determining means comprises a pixel detection and control circuit, and wherein said pixel detection and control circuit generates a control signal for selecting said selected harmonic color cluster in response to said determined maximum tonal color value.

18. The apparatus of claim 17 wherein said converting means comprises:

a threshold circuit for iteratively comparing the tonal value of each first input pixel with a threshold value;

an error buffer for storing an error value defining the difference between the first input pixel value and the threshold value; and an error filter circuit for diffusing the error value among neighboring pixels of each stream.

19. The apparatus of claim 18 wherein the error buffer stores the error values of an immediately previous series of pixels, and wherein the error values are selected from the error buffer.

20. An apparatus for improving the color vividness of a halftone image generated from a plurality of streams of continuous-tone input pixels, each stream comprising pixels having values of a specific tonal color, the apparatus comprising:

means for converting a first input pixel of each stream into a first binary pixel value;

means for collectively processing said first binary pixel value from each stream to generate inter-color information;

means for providing said inter-color information to an output buffer for printing as processed halftone color pixel values that improve the color vividness of the halftone image; and an input buffer for storing the tonal pixel values of an immediately previous series of pixels, and wherein the previously processed pixels are selected from the buffer.

21. A computer system comprising:

a memory for storing data and programs;

a central processing unit responsive to programs stored in the memory for controlling and coordinating the operation of the computer system;

digitizing means responsive to a continuous-tone image for generating a stream of electronically encoded pixel values, each representing a grayscale value of a portion of the continuous-tone image;

an input buffer responsive to the stream of electronically encoded pixel values for storing the electronically encoded pixel values in a plurality of linear segments, each linear segment comprising pixel values that represent contiguous portions of the continuous-tone image;

a pixel detection and control circuit for determining a maximum grayscale value of the electronically encoded pixels;

error diffusion halftoning means for quantizing the grayscale values into a halftone pattern, and for generating quantization errors adapted for diffusion among neighboring encoded pixel values of the stream;

a color correction circuit for generating inter-color information from said quantized grayscale values and for correcting said inter-color information to generate predetermined color values when said inter-color information does not match a color value of a selected harmonic color cluster, said selected harmonic color cluster being selected in response to said determined maximum grayscale value; and a printer responsive to said predetermined color values for printing the halftone pattern of monochrome dots on a print medium to generate a halftone image.

* * * * *

UNITED STATES PATENT AND TRADEMARK OFFICE
CERTIFICATE OF CORRECTION

PATENT NO. : 5,675,716
DATED : October 07, 1997
INVENTOR(S) : Joseph Shu

It is certified that error appears in the above-identified patent and that said Letters Patent is hereby corrected as shown below:

Title page, item 56 References Cited:

Insert --4,955,065  9/1990  Ulichney-- under U.S. Patent Documents.

Insert --Foreign Patent Documents 0 570 139 A2  11/1993  EPO 0 272 147  6/1988 EPO

WO 90/90975  8/1990  WO--.

Insert --Other Publications

Angling for Color, B. Fraser, *Publish* June (1991) pp. 74-82.

*Society for Information Display Intern. Symposium Digest of Technical Papers Vol. XXV*, San Jose, CA, June 14-16, (1994); Adaptive Error Diffusion for Multiresolution Rendering, P.W. Wong, pp. 801-804.

*Society for Information Display Intern. Symposium Digest of Technical Papers Vol. XXV*, San Jose, CA, June 14-16, (1994); An Efficient Implementation for Stochastic DBS, T.J. Flohr et al. Pp. 797-800.

UNITED STATES PATENT AND TRADEMARK OFFICE
CERTIFICATE OF CORRECTION

PATENT NO. : 5,675,716
DATED : Ocotber 07, 1997
INVENTOR(S) : Joseph Shu

It is certified that error appears in the above-identified patent and that said Letters Patent is hereby corrected as shown below:

*Society for Information Display Intern. Symposium Digest of Technical Papers Vol. XXV*, San Jose, CA, June 14-16, (1994); The Blue-Noise Mask and Its Comparison with Error Diffusion in Color Halftoning, M. Yao et al., pp. 805-808.--

Signed and Sealed this

Twentieth Day of January, 1998

Attest:

BRUCE LEHMAN

*Attesting Officer*  Commissioner of Patents and Trademarks